United States Patent [19]

Bens

[11] 3,934,138
[45] Jan. 20, 1976

[54] APPARATUS FOR MEASURING SURFACE STRESS BY X-RAY DIFFRACTION

[75] Inventor: Jeans Bens, Paris, France

[73] Assignee: Compagnie General de Radiologie, Paris, France

[22] Filed: Mar. 27, 1974

[21] Appl. No.: 455,513

[30] Foreign Application Priority Data
Mar. 30, 1973  France .............................. 73.11617

[52] U.S. Cl. ................ 250/278; 250/277; 250/272; 250/385
[51] Int. Cl.² ......................................... G01N 23/20
[58] Field of Search ........... 250/272, 273, 277, 278, 250/385, 374

[56] References Cited
UNITED STATES PATENTS

| | | | |
|---|---|---|---|
| 3,011,060 | 11/1961 | Dorenbosch et al. | 250/272 |
| 3,030,507 | 4/1962 | Khol | 250/278 |
| 3,402,291 | 9/1968 | Weinman | 250/277 |
| 3,517,194 | 6/1970 | Borkowski et al. | 250/385 |
| 3,617,705 | 11/1971 | Takano | 250/273 |
| 3,639,758 | 2/1972 | Shimura | 250/278 |

Primary Examiner—James W. Lawrence
Assistant Examiner—B. C. Anderson
Attorney, Agent, or Firm—Cushman, Darby & Cushman

[57] ABSTRACT

An apparatus for measuring stress on the surface of a polycristalline body X-ray diffraction including an X-ray source assembled together with two position-sensitive radiation detectors of known type located symmetrically with respect to the primary X-ray beam emitted by said source. The diffracted radiation gives rise to gaseous discharges within said detectors, which deliver signals respectively indicating the location of the ionizing event along their collector electrodes. From these locations along the collector, it is possible to determine the interplanar spacing $d$ of the crystal lattice, which varies with the stress it is subjected to.

4 Claims, 5 Drawing Figures

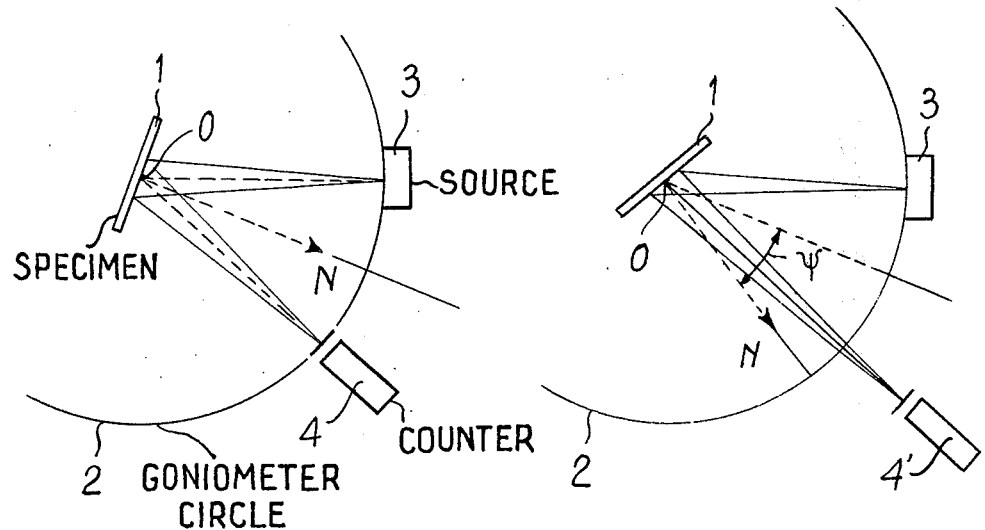
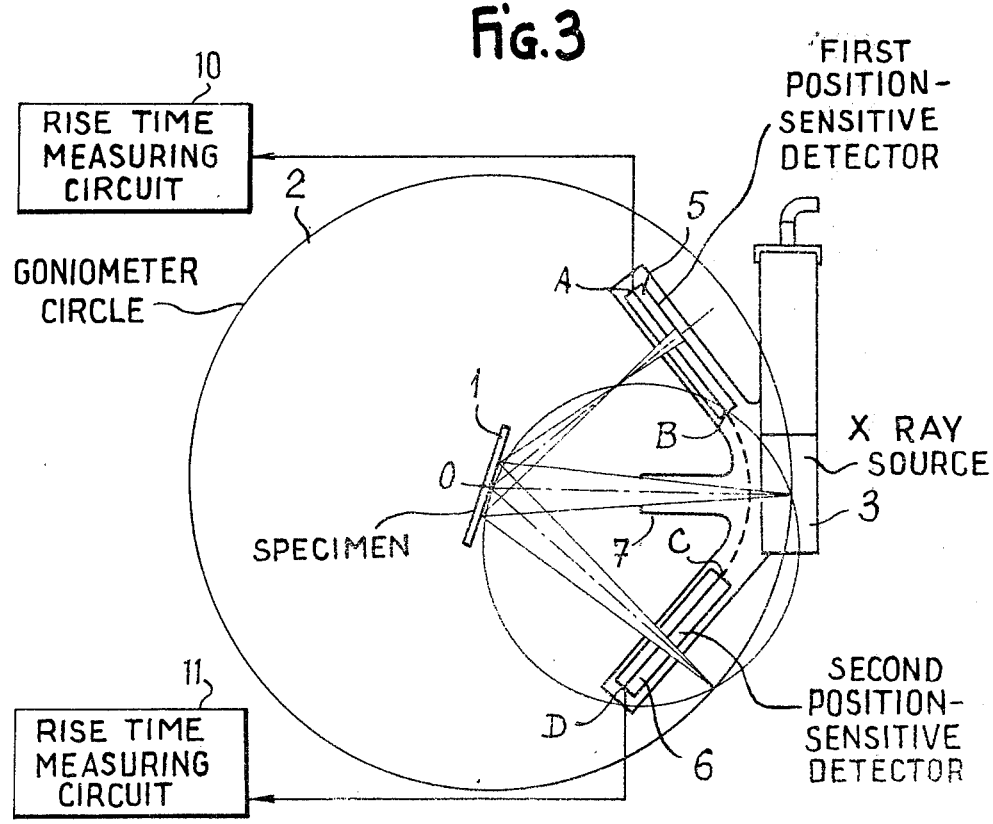

APPARATUS FOR MEASURING SURFACE STRESS BY X-RAY DIFFRACTION

BACKGROUND OF THE INVENTION

The present invention relates to an apparatus for measuring stress at the surface of a polycrystalline structure by means of X-ray diffraction techniques. It is well known, that when an X-ray beam strikes a crystal, part of the incident energy is transmitted, part thereof is absorbed by the crystal and part is diffused or diffracted, that is to say that radiation of the same wavelength as the incident radiation is emitted in directions differing from those of the incident primary beam.

The diffraction conditions are determined by Bragg's law $\lambda = 2d \sin \theta$ which is a simple expression of the conditions of phase matching between the waves diffracted by the different atoms of the crystal. In this formula, $\lambda$ is the wavelength, $d$ is the interplanar spacing i.e. spacing between the neighboring planes of a set of parallel lattice planes, and $\theta$ is the diffraction angle i.e. the angle of the incident (or diffracted) beam in relation to the set of parallel lattice planes.

Thus, it will be seen, that, as will be familiar to those skilled in the art, the measurement of the diffraction angle makes it possible, through use of the Bragg relationship, to determine in the interplanar spacing if the wavelength of the X-ray radiation is known.

The existence of a stress at the surface of a polycrystalline body produces a modification of the shape of the crystal lattice, which can be measured as a variation $\Delta d$ of the interlattice spacing $d$ of the set of lattice planes.

The determination of stress can thus be carried out by measuring the value $\Delta d/d$.

Excellent prior art equipment for laboratory use is available in the shape of the counter-type diffractometer.

Such a diffractometer using the goniometric method of measurement includes a radiation detector of the scintillation or proportional type and, as will be explained hereinafter with reference to FIGS. 1 and 2 of the accompanying drawings schematically illustrating this prior art equipment, necessitates the following features:

a. a monochromatic and collimated source of X-rays using a crystal type monochromator to select the $K_{\alpha 1}$ line of the characteristic spectrum of the X-ray tube and provide a unique wavelength $\lambda$;

b. precise mechanical means for the respective angular positioning and displacements of the specimen or the X-ray source and the radiation detector in order to satisfy the conditions of diffraction;

c. means for displacing the detector and the analyser slot along the diffracted secondary beam so as to follow the focal point thereof, whose distance with respect to the specimen varies according to the angle $\psi$ between the normal to the surface of the specimen at the point of impact of the primary X-rays and the normal to the internal set of parallel lattice planes causing the diffraction; and d. means for precisely measuring the angles $\theta$ and $\psi$.

From the above considerations, it can easily be seen that such an apparatus it too complex and bulky to carry out stress measurements on the site, i.e. to measure the stress at the surface of heavy and bulky components whose transportation and location inside a laboratory equipped with the afforementioned apparatus is difficult or impossible.

It is an object of the present invention to provide apparatus for measuring stress of polycristalline bodies by X-ray diffraction techniques, on the site, by using positionsensitive radiation detectors such as those described in U.S. Pat. No. 3,483,377 filed Nov. 3, 1967 or U.S. Pat. No. 3,517,194 filed Oct. 24, 1968, wherein a gaseous discharge generated by the incident secondary radiation gives rise to a signal allowing the localisation thereof with respect to the extremities of such a detector.

SUMMARY OF THE INVENTION

According to the invention, there is provided an apparatus for measuring stress on the surface of a polycrystalline body by X-ray diffraction, by means of measuring the variation of the interplanar spacings of a set of lattice planes as a function of the angle $\psi$ between the normal to the lattice planes diffracting the incident primary X-ray beam and the normal at the point of impact of said primary beam to the surface of the body whose stress is to be measured, said apparatus comprising:

an X-ray source for emitting a narrow primary X-ray beam rendered quasi-monochromatic by filtering and having a focal point whereon said X-ray beam originates;

a first and a second position-sensitive radiation detector for respectively simultaneously receiving two secondary X-ray beams diffracted by a single set of lattic planes at the surface of said body, said detectors being assembled integrally with said X-ray source, including elongated collector electrodes located symmetrically to said primary X-ray beam and respectively delivering signals for simultaneously localizing, by means of an electronic measuring circuit, the respective points of penetration of said secondary beams into said detectors; and means for pivotably mounting the assembly made up from said X-ray source and said detectors for rotation about an axis traversing said point of impact at said body surface and perpendicular to a plane defined by said focal point, said primary beam and said collector electrodes, combined with means for measuring the angular position of said focal point relatively to said normal to said body surface, whereby to simultaneously measure the differences of the interplanar spacings corresponding to two different angles $\psi$, either relatively to an unstressed first specimen placed at the point of impact of said primary beam, or relatively to a position of said focal point where the primary beam is aligned with said normal to said body surface and where both angles $\psi$ are equal to zero, these differences indicating the magnitude of the stress to be measured, whose calibration is carried out by placing a second specimen subjected to a known amount of stress at said point of impact.

BRIEF DESCRIPTION OF THE DRAWINGS

These and other features and advantages of the present invention will become apparent from the following description, given by way of example, when taken in conjunction with the accompanying drawings, wherein:

FIGS. 1 and 2 schematically illustrate the prior art equipment of the above described type when used for the measurement of stress;

FIG. 3 schematically illustrates a first embodiment of the apparatus according to the invention;

DESCRIPTION OF THE PRIOR ART —

Figure 4:
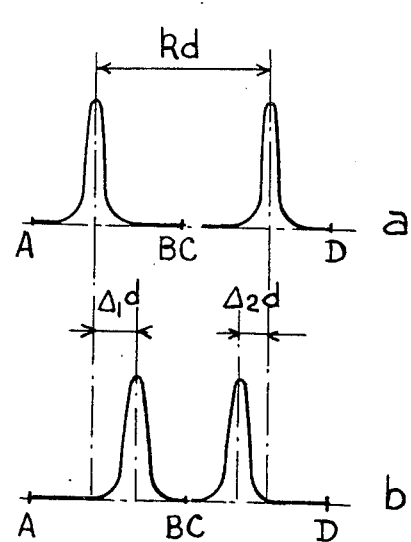
FIG. 4 is a diagram for illustrating the operation of the apparatus of FIG. 3.

FIG. 1 schematically illustrates prior art equipment for laboratory use, wherein the specimen 1 is arranged at the centre 0 of a goniometer circle 2. The X-ray source 3 is a sealed tube with a carefully stabilised power supply (not shown) and including cristal monochromator (not shown) for producing monochromatic radiation in the form of a beam having a small divergence of a few degrees, which is incident upon the flat face of the specimen 1. When the abovecited angle $\psi$ is equal to zero, the diffracted beam is focussed on the goniometer circle 2 at the input analysis slot of the counter 4. On the goniometer circle, the angular interval between the source 3 and the counter 4 is equal to $\pi - 2\theta$. As stated earlier, a knowledge of the wavelength and of the angle $\theta$ makes it possible to calculate the interplanar spacing $d$ by using Bragg's equation.

Those skilled in the art will be aware that the determination of stress by the measurement of the interlattice distance $d$ has to be carried out for two angular values differing by an angle $\psi$ which, as mentioned before, is equal to the angle between the geometric normal to the flat face of the specimen 1 at the point of impact 0 of the radiation and the normal to the set of parallel lattice planes used.

FIG. 2 illustrates the diffractometer of FIG. 1 after the specimen 1 has been rotated through 30°. If the specimen is subjected to stress, the angular position of the counter 4 varies by no more than a few tenths of a degree, but the focussing of the diffracted beam occurs outside the goniometer circle and it is necessary to radially displace the counter 4, with respect to the goniometer circle 2, in order to shift it the position 4', where the beam focus coincides with input slot of the counter.

The use of the apparatus described hereinbefore is not too restrictive for laboratory applications where measurements on relatively small samples are being carried out.

FIG. 3 shows an apparatus according to the invention particularly adapted to carry out on site measurements of stress.

DETAILED DESCRIPTION OF THE INVENTION

Referring to FIG. 3, the specimen 1 is subjected to a monochromatic radiation, coming from an X-ray source 3 including filters, i.e. not using the bulky crystal monochromator nor the regulated power supply of the prior art. As those skilled in the art will appreciate, the diffracted beam is distributed on a cone of which only sections taken through the plane of the Figure have been shown. Each of the two diffracted beams focusses on a circle which is tangential to the specimen at the point of impact of the primary X-ray beam and passes through the focus of the source 3.

The two beams are respectively analysed by two position-sentive proportional radiation detectors 5 and 6 of the type described in the first mentioned United States Patent, for example. In FIG. 3, the detector 5 is located beyond the focal point of the diffracted beams, while the detector 6 is placed before it. The X-ray source 3, the collimator 7, and the detectors 5 and 6 form an integral assembly.

Such a position-sensitive proportional radiation detector comprises an ionizing radiation detecting element having a very high resistance collector in the shape of a straight highly resistive wire for delivering at one of its extremities an output voltage pulse having a rise time proportional to the distance between the location of an ionizing event and the output end of the collector. In one of the embodiments of the position-sensitive detector, this wire is placed inside a gas-filled detector tube surrounded by a conductive cylindrical wall coaxial therewith; the distributed resistance of said wire and the distributed therewith; capacitance forms a distributed RC integrating network controlling the rise time of the output pulses according to the distance of the ionizing event relatively to the output end of the detector and allows the measurement of this distance by means of a rise time measuring electronic circuit including a multipolar pulse shaping network, cross-over or zero crossing detectors, time-to-amplitude converters and a multichannel pulse height analyser recording the signals delivered by said converter. The data recorded are utilized to deliver on an oscilloscope screen curves in the shape indicated by FIG. 4 or may be handled by a computer.

In FIG. 3, the two detectors 5, 6 respectively include collector wires whose respective extremities are indicated by A, B and C, D.

The wires AB and CD are directly electrically connected together by means of a connection shown by a dashed line in FIG. 3.

The two detectors 5 and 6 are symmetrically located in relation to the collimator 7 which focusses the primary beam coming from the source 3 and irradiating the specimen 1, i.e. relatively to the X-ray beam axis, and in the first embodiment of FIG. 3 the collector wire AB, CD are tangent to a circle whose center is located at the point of impact 0 of the primary beam with the surface of the specimen 1.

The penetration of the diffracted beam inside the detector volume at a specific location gives rise to a ionizing discharge between the collector and the wall, generating on the wire AB of detector 5 a pulse which propagates towards both ends A and B thereof. Detector 6 operates in a similar manner. The adjacent ends B and C of detectors 5 and 6 are conductively connected together and outer ends A and C are respectively connected to two rise time measuring circuits 10 and 11, which indicate pricisely the location of the ionizing events in both detectors. The half way line of the wires of the two detectors 5, 6 is to be located in such a way as to correspond the average diffraction angle $\theta$ to be measured and the lengths of the detectors 5 and 6 are chosen such that each of them intercepts the whole of the angular range covered by the angles $\theta$ used for measuring, depending on the nature of the specimen to be measured. Under these conditions, it is no longer necessary to provide for goniometer movements in the way which was required with the counter-type diffractometer of FIGS. 1 and 2.

Moreover, the determination of the position of the ionizing events due to radiation is carried out by the detector itself and no longer by the displacement of a detector with an input slot in the manner employed with the system shown in FIG. 2, so that there is no need to follow the variations in the focal length, this latter phenomenon results only in a widening of the diffraction curves (see FIG. 4) recorded in the multichannel pulse height analysers (not shown) as will be explained hereinafter.

Each of the resistive collector wires AB and CD feeds a multichannel pulse-height analyser through an intermediate circuitry as mentioned above, these analysers record in each of their channels a limited range of pulse amplitudes which correspond to the rise times of the signals delivered by the aforementioned collectors and consequently to the location of the ionizing event caused by the diffracted X-ray beam.

When the recorded information is to be reproduced, for example, by an oscilloscope by successively sweeping through the channels to read out the number of pulses recorded therein.

Such a read out gives to bell-shaped curves as indicated in FIG. 4, whose peaks, called a diffraction peaks, indicate the location of the ionizing events along the collector wires, this location being indicative of the diffraction angle $\theta$ and consequently of interplanar spacing $d$.

Diagram $a$ (the upper one) of FIG. 4 shows two bell-shaped curves obtained by consecutive sweeping of the two multichannel analysers respectively contained in the electronic measuring circuits 10 and 11.

In FIG. 4$a$, the peaks are substantially equidistant from the point B = C, which is generally the case for unstressed specimens, and the interval $kd$ between the peaks ($k$ being a constant) is obviously proportional to the interplanar spacing of such a specimen.

In FIG. 4$b$, the bell-shaped curves indicate a shift of the respective ionizing events along the collector wires and thus a shift of the interlattice spacing. The respective shifts $\Delta_1 d$ and $\Delta_2 d$ of the two peaks of diffraction with respect to those of the unstressed specimen, indicate the presence of stress at the surface of the specimen thus measured. If the stress the specimen is subjected to is known, this measurement can be used, as will be explained hereinafter, for calibrating the apparatus according to the invention, to enable it to measure the stress of a random specimen.

From the abovementioned shifts $\Delta_1 d$ and $\Delta_2 d$, it is easily possible, if the stress in the stressed specimen is known, to calculate the corresponding angles $\psi_1$ and $\psi_2$.

Knowing the angles $\psi_1$ and $\psi_2$ for each detector, measurements of the shifts of the diffraction peaks in the case of the irradiation of a specimen whose stress state is unknown, makes it possible to determine said unknown stress.

If no calibrating specimen subjected to a known stress were available, it is also possible to determine the angles $\psi$ corresponding to the stress of the specimen, by using a mechanical rotary device for carrying the sourcedetector assembly (3, 7, 5 and 6), mounted thereon, rotatably about an axis perpendicular to the plane of the drawing at the center 0 of the goniometer circle 2. This rotary device includes graduated means for measuring the angular position of the focal point of the X-ray source 3 on the goniometer circle. For calibration purposes, the X-ray source 3 is positioned to provide a primary beam perpendicular to the surface of the specimen at its point of impact thereon. This so called "normal" position of the source 3 produces in the two detectors 5 and 6 and their respective allied circuitry 10 and 11, two responses having diffraction peaks (Debye ring section) which are perfectly symmetrically centered with respect to the primary beam, i.e. in this case $\psi_1 = \psi_2 = 0$.

Thereafter, when the source-detector assembly is rotated about the aforementioned axis, which can be materialized in the shape of a spindle (not shown) aligned with the surface of the specimen to be measured and rigid arm member (not shown) whose one end pivots about this spindle and whose other end is fixedly secured to said assembly, the angles $\psi$ differing from zero can be measured from the relative position of the X-ray source 3 to the previously measured "normal" one and the respective positions of the ionizing events along the collector wires A, B and C, D of the two detectors 5 and 6.

Figure 5:
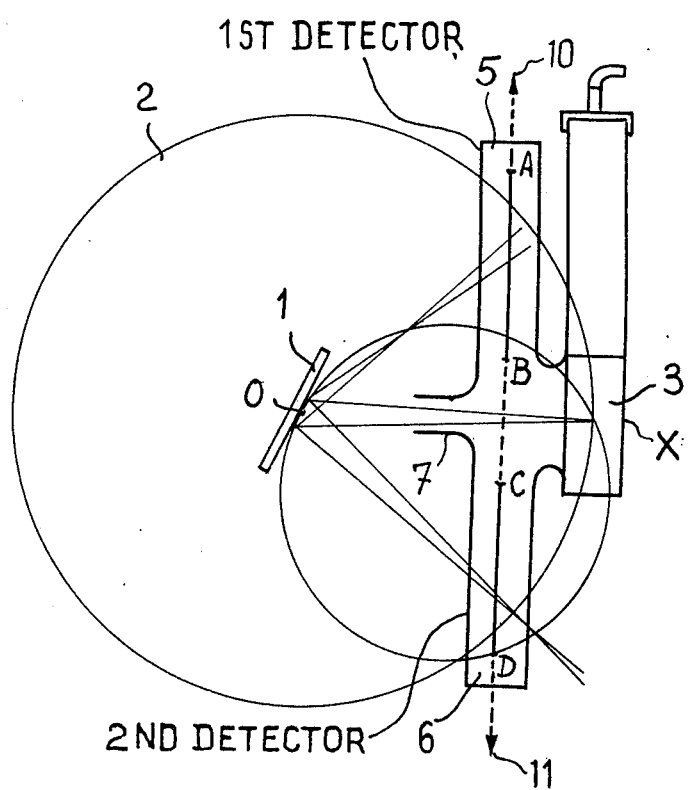
FIG. 5 represents schematically a second embodiment of the apparatus according to the invention.

FIG. 5 illustrates a variant embodiment of the apparatus, in which the two collector electrodes of both detectors 5 and 6 are arranged along a single straight line normal to the axis of the incident beam and located symmetrically to said beam and in a plane perpendicualr to the axis of pivoting of the source-detector assembly.

A source-detector assembly combined with the rotary mechanical device and the goniometer circle can be easily mounted on the site of a bulky object whose surface stress is to be measured, such as a pressure boiler or a locomotive wheel, i.e. the measurements can thus be carried out in field locations and not only in laboratory conditions.

What is claimed is:

1. Apparatus for measuring stress on the surface of a polycrystalline body by X-ray diffraction, by means of measuring the variation of the interplanar spacings of a set of lattice planes as a function of the angle $\psi$ between the normal to the lattice planes diffracting the incident primary X-ray beam and the normal, at the point of impact of said primary beam to the surface of the body whose stress is to be measured, said apparatus comprising in combination: a single X-ray source for emitting a narrow primary X-ray beam rendered quasi-monochromatic by filtering and having a focal point whereon the X-ray beam originates; first and second position-sensitive radiation detectors having elongated collector electrodes for respectively simultaneously receiving two secondary X-ray beams diffracted by a single set of lattice planes at the surface of said body and for respectively delivering signals for simultaneously localizing, by means of an electronic measuring circuit, the respective points of penetration of said secondary beams into said detectors, said detectors being assembled fixedly and integrally with said X-ray source, summetrically to said X-ray source and primary X-ray beam and facing the same side of said body surface as said X-ray source; and means for pivotably mounting the integral assembly made up from said X-ray source and said symmetrically positioned detectors for rotation about an axis traversing said primary X-ray beam at said point of impact on said body surface, tangentially to said surface, and perpendicular to a plane defined by said focal point, said primary beam and said collector electrodes, combined with means for measuring the angular position of said focal point relatively to said normal to said body surface, whereby to simultaneously measure the differences of the interplanar spacings corresponding to two different angles $\psi$, preferably by means of one of two equivalent methods for obtaining the indication corresponding to absence of stress, i.e. either relatively to an unstressed first specimen of the same material as said body placed at the point of impact of said primary beam, or relatively to a position of said focal point where the primary beam is aligned with said normal to said body surface and where both angles $\psi$ are equal to zero, these differences indicating the magnitude of the stress to be measured, whose calibration is carried out by placing a second specimen of said same material, subjected to a known amount of stress, at said point of impact.

2. Apparatus as claimed in claim 1, wherein said collector electrodes of said first and second detectors are respectively located along two straight lines tangent to a circle drawn around said point of impact and intersecting with each other on the axis of said primary X-ray beam; said lines, said primary beam axis and said point of impact lying in a plane perpendicular to the axis of rotation of said source-detector assembly.

3. Apparatus as claimed in claim 1, wherein said collector electrodes of said first and second detectors are both aligned along a single straight line perpendicular to the axis of said primary X-ray beam, said line being located in a plane perpendicular to the axis of rotation of said source-detector assembly.

4. Apparatus as claimed in claim 1, wherein the adjacent ends of said collector electrodes are electrically connected together.

* * * * *